(12) United States Patent
Francis Kepley, Jr. et al.

(10) Patent No.: US 6,736,516 B1
(45) Date of Patent: May 18, 2004

(54) PROJECTION SYSTEM

(75) Inventors: Le Roy Francis Kepley, Jr., Dallas, TX (US); William K. King, Carrollton, TX (US); Scott A. Herkimer, Dallas, TX (US); Robert W. Jones, Dallas, TX (US)

(73) Assignee: Technological Systems Sales, Inc., Dallas, TX (US)

( * ) Notice: Subject to any disclaimer, the term of this patent is extended or adjusted under 35 U.S.C. 154(b) by 0 days.

(21) Appl. No.: 10/288,242

(22) Filed: Nov. 5, 2002

(51) Int. Cl.[7] .................. G03B 21/14; G03B 21/56; F16M 11/05
(52) U.S. Cl. .................. 353/79; 359/443; 248/918
(58) Field of Search .................... 359/443; 353/79, 353/80, 65; 248/917, 918

(56) References Cited

U.S. PATENT DOCUMENTS

| | | | | |
|---|---|---|---|---|
| 947,058 | A | * | 1/1910 | Duncan ........................ 353/79 |
| 1,840,920 | A | * | 1/1932 | Spaulding ..................... 353/79 |
| 5,746,599 | A | * | 5/1998 | Lechner ........................ 353/79 |
| 6,540,366 | B2 | * | 4/2003 | Keenan et al. ................ 353/79 |

* cited by examiner

Primary Examiner—Christopher Mahoney
(74) Attorney, Agent, or Firm—Gregory M. Howison; Howison & Arnott, LLP

(57) ABSTRACT

A projection apparatus is disclosed having a first vertical member and a second vertical member disposed parallel to the first vertical member, the second vertical member substantially the same length as the first vertical member. An upper crossbar member is disposed between the first and second vertical members and perpendicular thereto. An intermediate crossbar member is disposed between the first and second vertical members and perpendicular thereto and below the upper crossbar member to define a viewing area bounded by the first and second vertical members, the upper crossbar member and the intermediate crossbar member. A viewing screen is disposed over the viewing area. A mounting member is provided extending over the upper crossbar member and having a mounting end disposed forward of the viewing area a first predetermined distance and a securing end extending rearward of the viewing area a second predetermined distance, the mounting member interfaced to the upper crossbar member in a pivotal manner such that the mounting end is disposed along the length of the viewing area at a predetermined length. A securing device secures the securing end of the mounting member to at least one of the vertical members outside of the viewing area.

8 Claims, 5 Drawing Sheets

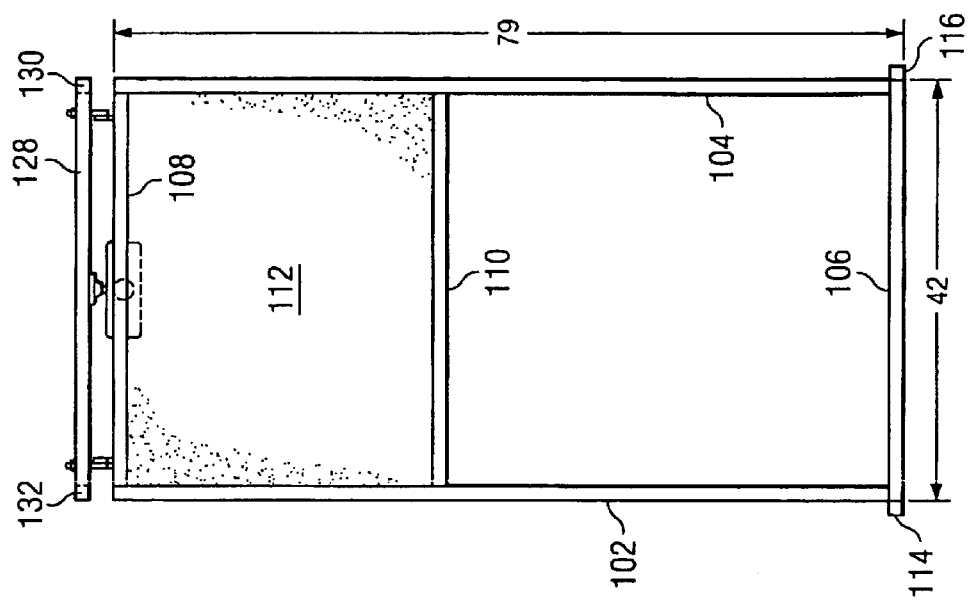
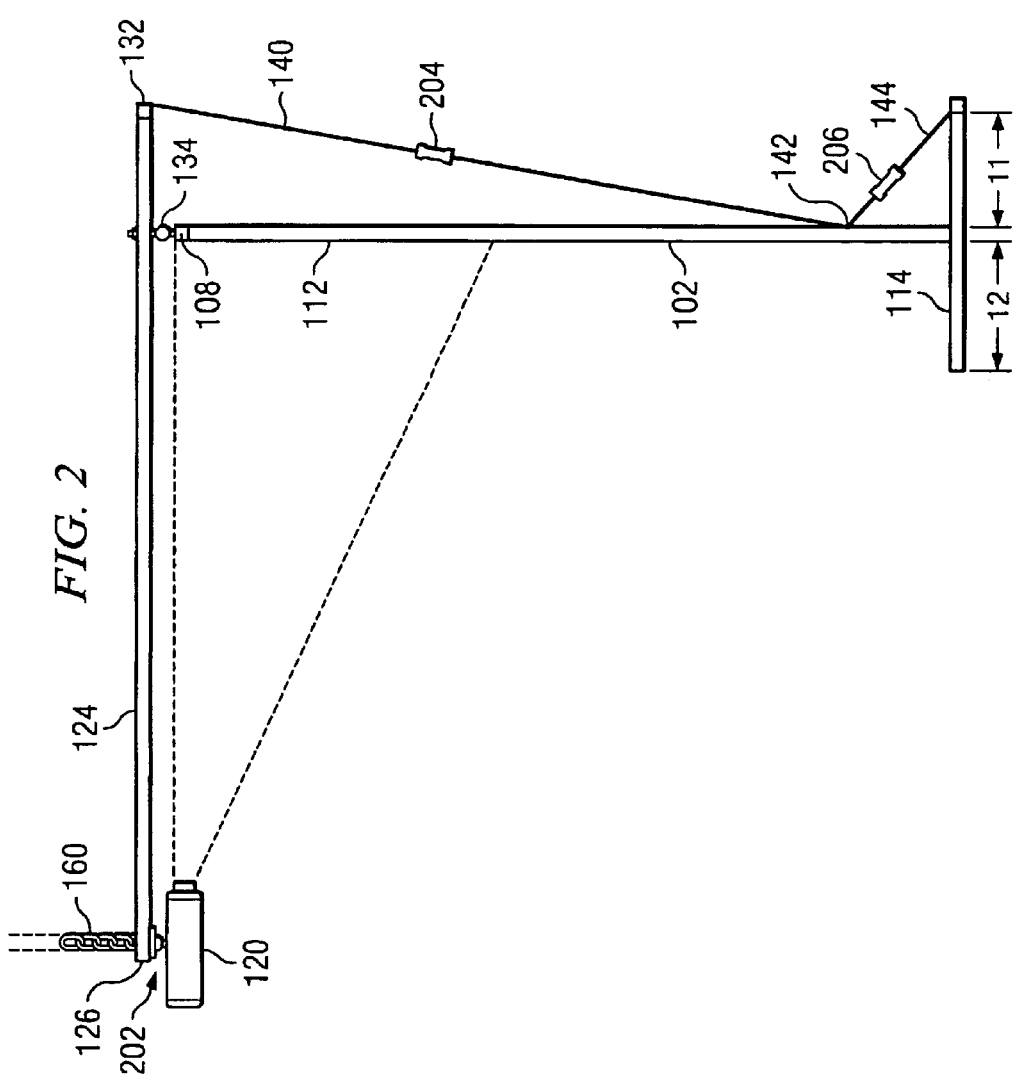

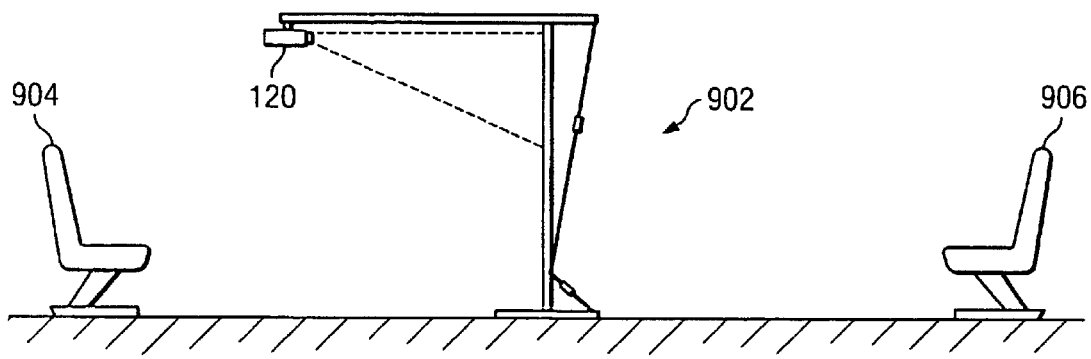
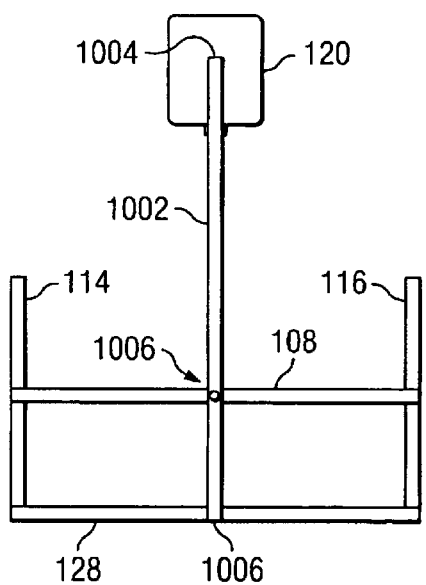
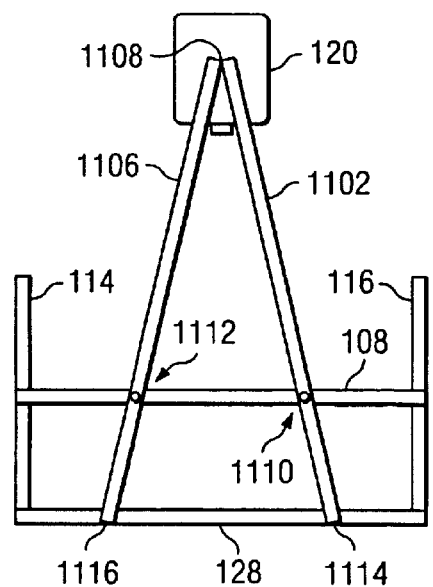

PROJECTION SYSTEM

TECHNICAL FIELD OF THE INVENTION

The present invention pertains in general to projector systems and, more particularly, to a mounting system for mounting a projector and screen in combination.

BACKGROUND OF THE INVENTION

Audio visual displays typically utilize some type of forward projection system that utilizes a liquid crystal display (LCD) projector that is mounted a predetermined distance away from a screen. This screen can either be reflective for viewing from the same side as the projector or the screen can be somewhat less than opaque such that the projector can be mounted on the rear side of the screen. Typically, these projectors are mounted on some type of mobile caddy that can be disposed in the room. However, such a mounting of the projector utilizes valuable floor space in a viewing room. As such, some of these projectors have been ceiling mounted such that they can be mounted on the ceiling away from the seating area or above the seating area. The problem with this type of mounting is the wiring, the fact that the mounting has to be predefined and the lack of mobility therefor. In some applications, there has been provided a combination of a structure for mounting the projector wherein the screen is part of that structure. However, these types of structures require some type of support for the projector in front or at the rear, in addition to the mounting structure for the screen.

SUMMARY OF THE INVENTION

The present invention disclosed and claimed herein, in one aspect thereof, comprises a projection apparatus having a first vertical member and a second vertical member disposed parallel to the first vertical member, the second vertical member substantially the same length as the first vertical member. An upper crossbar member is disposed between the first and second vertical members and perpendicular thereto. An intermediate crossbar member is disposed between the first and second vertical members and perpendicular thereto and below the upper crossbar member to define a viewing area bounded by the first and second vertical members, the upper crossbar member and the intermediate crossbar member. A viewing screen is disposed over the viewing area. A mounting member is provided extending over the upper crossbar member and having a mounting end disposed forward of the viewing area a first predetermined distance and a securing end extending rearward of the viewing area a second predetermined distance, the mounting member interfaced to the upper crossbar member in a pivotal manner such that the mounting end is disposed along the length of the viewing area at a predetermined length. A securing device secures the securing end of the mounting member to at least one of the vertical members outside of the viewing area.

BRIEF DESCRIPTION OF THE DRAWINGS

For a more complete understanding of the present invention and the advantages thereof, reference is now made to the following description taken in conjunction with the accompanying Drawings in which:

FIG. 2 illustrates a side view of the projector mounting system;

FIG. 3 illustrates a rear view of the projector mounting system;

FIG. 9 illustrates a diagrammatic view of two different uses of the projector mounting system of the present disclosure;

FIG. 10 illustrates an alternate embodiment of the support mechanism for the projector; and FIG. 11 illustrates another embodiment of the support structure for the projector system.

DETAILED DESCRIPTION OF THE INVENTION

Figure 1:
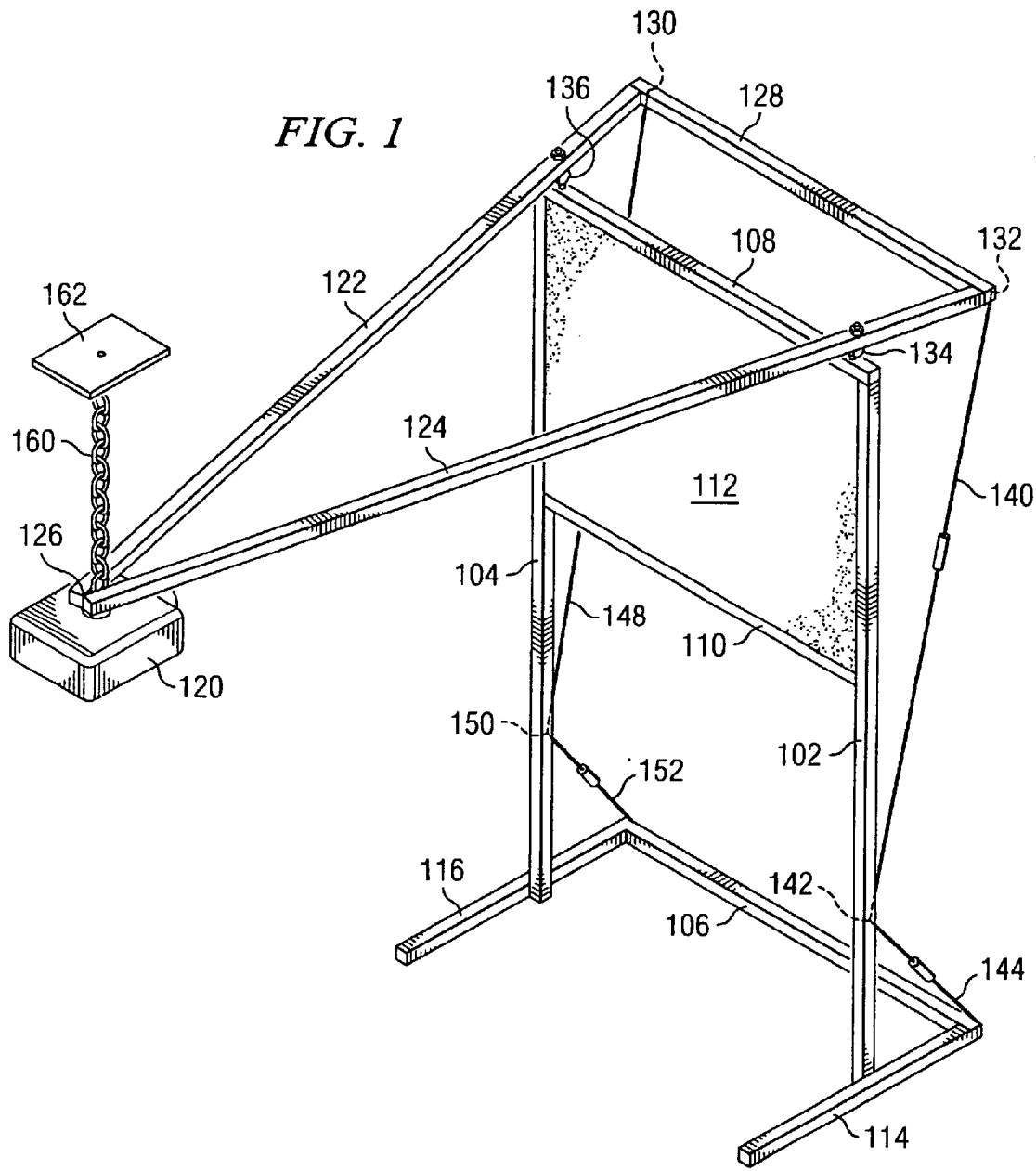
FIG. 1 illustrates a perspective view of the projector mounting system of the present disclosure.

Referring now to FIG. 1, there is illustrated a perspective view of the projector mounting system of the present disclosure. First and second vertical members 102 and 104 are provided which are approximately 79 inches in height and disposed a distance of approximately forty inches apart and extend in a vertical direction from a flat surface. A bottom crossbar member 106 is provided for connecting the bottom ends of the two vertical members 104 and 102. A top crossbar member 108 is provided that is disposed across the top of the two vertical members 102 and 104 and is connected thereto. Each of the crossbar members 106 and 108 are approximately 42 inches in length. There is also provided a middle crossbar member 110 disposed between the two vertical members 102 and 104 at a distance from the crossbar member 106 of approximately forty inches from the crossbar member 108 with a length of approximately forty inches. A screen 112 is disposed over the area bounded by the two vertical members 102 and 104, the upper crossbar member 108 and the middle crossbar member 110. The screen 112 can either be reflective for front viewing or of an opaqueness to provide for rear viewing, i.e., one can view the image from the opposite side of an image source.

Each of the vertical members 102 and 104, the upper and lower crossbar members 106 and 108 and the middle crossbar member 110 are fabricated from a one inch extruded aluminum stock that is rectangular. This provides a fairly lightweight structure. To support the structure, there are provided two support arms or leg members 114 and 116 disposed at the bottom of each of the vertical members 102 and 104 and perpendicular to the ends of the bottom crossbar member 106. Each of the leg members 114 and 116 has a dimension of approximately 24 inches in length and is affixed at the center thereof to the ends of the crossbar member 106. Each of the leg members 114 and 116 are fabricated from the same extruded stock of which the members 102 and 104 were fabricated.

A projector 120 is provided as an image source. This projector can be an LCD projector or any type of image source that can project an image from the front thereof a distance therefrom to a screen and be focused thereon. Any type of such source can be utilized, provided that it is reasonably lightweight and is required to be a predetermined distance from the screen. In the present disclosure, the projector 120 is an LCD projector that weighs approximately 4 lbs.

A projector mounting structure is provided that is comprised of two longitudinal members 122 and 124 that are joined together at one end to form an apex 126 and which extend outward from the apex 126 in a diverging manner and at an angle to each other, each of the longitudinal members 122 and 124 having a length of approximately ninety inches. At the end thereof, opposite apex 126, they are joined together with a crossbar member 128 having a dimension of approximately forty two inches. This dimension is substantially the same as that of the crossbar member 108. Each of the crossbar members 122 and 124 have an end 130 and an end 132, respectively. The longitudinal members 122 and 124 are disposed on the upper surface of the crossbar member 108 such that the crossbar member 124 is interfaced with the crossbar member 108 on the upper surface thereof at a pivot point 134 and the longitudinal member 122 is interfaced with the upper surface of the crossbar member 108 at a pivot point 136. The pivot points 134 and 136 are disposed along the length of longitudinal members 124 and 122 such that the end 132 and the end 130 are both disposed along the perpendicular from the end of the longitudinal member 124 a distance of approximately eleven inches.

The end 132 is secured with a cable 140 to a point 142 approximately twelve inches from the crossbar member 106 on the vertical member 102 with the point 142 secured with a cable 144 to the leg member 114 approximately eleven inches from the vertical member 102 and on the same side thereof as the end 132. Similarly, the end 130 is connected with a cable 148 to a point 150 on the rear of the vertical member 104 approximately twelve inches above the end thereof and the point 150 secured with a cable 152 to the end of the leg member 116 approximately eleven inches from the vertical member 104 on the same side as the end 130.

The cables 140 and 148 exert a downward force on the ends 132 and 130, respectively to support the apex 126 holding the projector 120. The projector 120, weighing only approximately 4 lbs. and the longitudinal members 122 and 124, being fabricated from the same material as the vertical members 102 and 104 will maintain the center of gravity of the overall structure behind the forward extending ends of the leg members 114 and 116, such that the structure will be self-supporting. However to prevent any inadvertent "toppling" of the structure, an additional chain 160 can be provided at the apex 126 for attachment to an attachment point 162 on the ceiling or some structure above the projector 120. This is for the purpose of preventing the structure from toppling due to external forces, such as an individual bumping into the structure or even external vibrations. This structure is operable to be disposed in a military or tactical situation where it may be disposed proximate to a battlefield. This is a harsh environment that can result in large vibrations from explosions, etc. Although the chain 160 is optional, it can prevent unwanted toppling due to these external forces.

Figure 4:
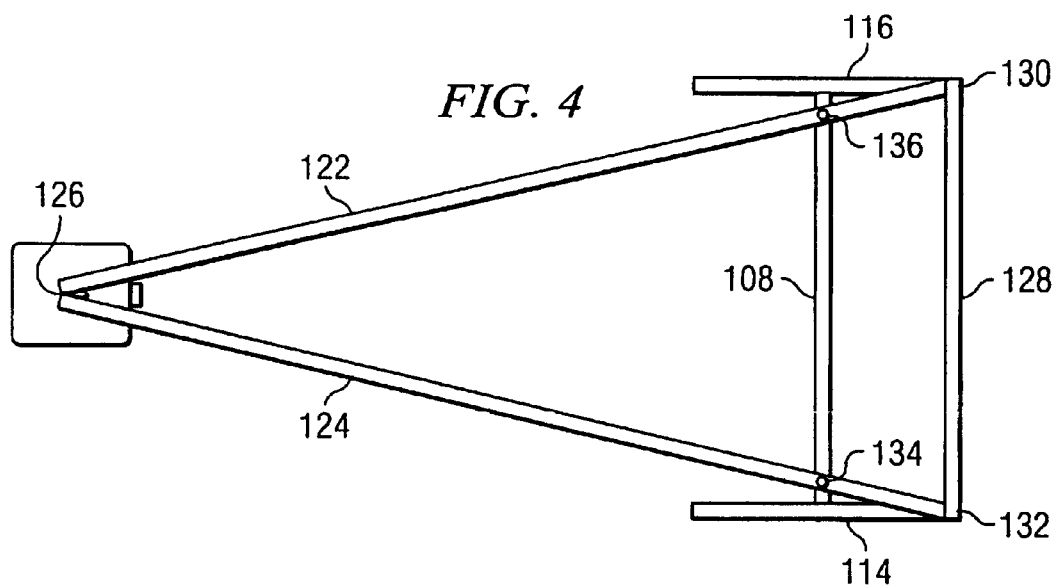
FIG. 4 illustrates a top view of the projector mounting system.

Referring now to FIG. 2, there is illustrated a side view of the projection system of the present disclosure, with FIG. 3 illustrating a rear view thereof and FIG. 4 illustrating a top view thereof. It can be seen in FIG. 2 that the projector is mounted to the apex with a projector mount 202, such that the projector 202 can project an image onto the screen 112. The projector 120 can be tilted with the mount 202 to accurately project the image on the screen 112. The pivot point 134 illustrated in FIG. 2 on one side, is disposed between the longitudinal member 124 and the upper surface of the crossbar member 108. The cable 140 is illustrated as being connected to the point 142 on the vertical member 102 a distance above the lower end thereof. There is provided a turnbuckle 204 on the cable 140 to allow for tensioning thereof and a turnbuckle 206 on the cable 144 for allowing tensioning thereof. However, it could be that an eyelet is provided at the point 142 and the cable 140 and cable 144 are a continuous cable such that only a single turnbuckle would be required. Additionally, the end 132 of longitudinal member 124 could be connected through a cable directly to the end of the leg member 114. However, such a connection might cause "bowing" of longitudinal member 102. The configuration illustrated in FIG. 2 would prevent this to some extent.

With the configuration illustrated in FIGS. 1–4, it can be seen that a single structure is provided that allows for both forward viewing and rear viewing in a single structure that combines both the screen 112 and the projector 120. Since the ends 130 and 132 with the associated cables 140 and 148 are disposed at the outermost edges of the screen 112, it can be seen that they will not be in the viewing area when viewing the screen from the rear side thereof for a rear projection system. The cable 140 is substantially parallel with the associated vertical member 102. This provides maximum support therefor. Since the end 132 does not extend sufficiently beyond the rearward portion of the leg 114, this allows the structure to be disposed against a back wall with the rear portion of the leg 114 defining the rearmost dimension thereof. As such, as long as the end 132 is disposed away from the vertical member 102 along the perpendicular at a distance equal to or less than the rearward extending portion of the leg 114, this will not interfere with the end 132, i.e., it will not touch the wall that the structure is disposed against.

Figure 5:
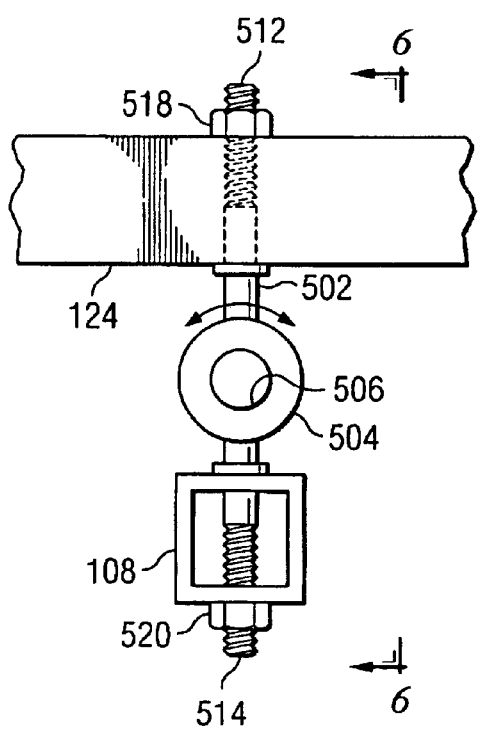
FIGS. 5 and 6 illustrate a detail of the pivoting mechanism.
Figure 6:
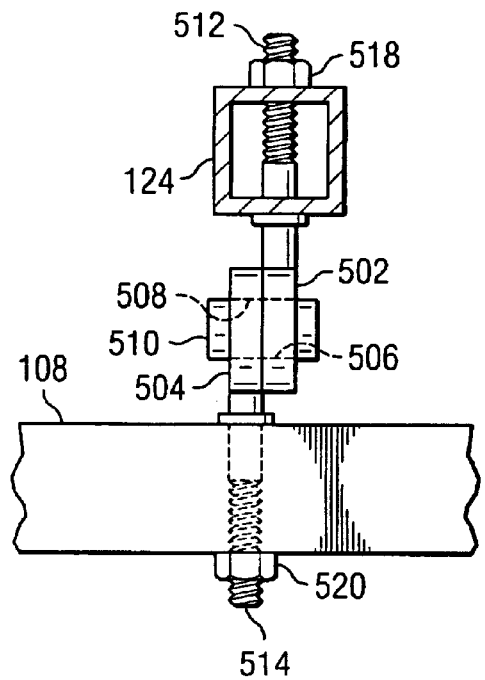

Referring now to FIG. 5, there is illustrated a detailed view of a pivot apparatus that is disposed at the pivot point 134 and at the pivot point 136. The apparatus is that disclosed as disposed at pivot point 134, it being recognized that the same pivot apparatus is disposed at the pivot point 136. FIG. 5 illustrates an end view looking from the end of the crossbar member 108 and FIG. 6 illustrates a view looking from the end view of the longitudinal member 124 in cross section. The pivot apparatus is comprised of first and second eyelet bolts 502 and 504. Each of the eyelet bolts 502 and 504 have a circular end 506 and 508, respectively, for opening therein. The circular sections 506 and 508 are disposed adjacent to each other such that the openings therein line up. A bushing 510 is disposed therebetween which has a generally cylindrical shape with a diameter that is selected to fit within the openings of each of the circular ends 506 and 508. This allows the two circular ends 506 and 508 to rotate relative to each other and in a plane parallel to the openings therein.

Each of the eyelet bolts 502 and 504 has a longitudinal threaded section 512 and 514, respectively, that is oriented such that they extend in opposite directions. The threaded longitudinal end 512 of eyelet bolt 502 extends upwards through a hole in the longitudinal member 124 to the opposite sides thereof to be connected thereto with a bolt 518. Similarly, the longitudinal threaded end of the eyelet bolt 504 extends through a hole in the crossbar member 108 and extends out the other side thereof and is affixed thereto with a bolt 520.

Figure 7:
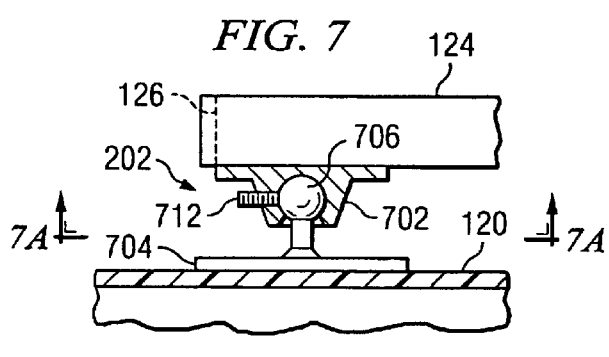
FIG. 7 illustrates a side view of the projector mount.
Figure 7A:
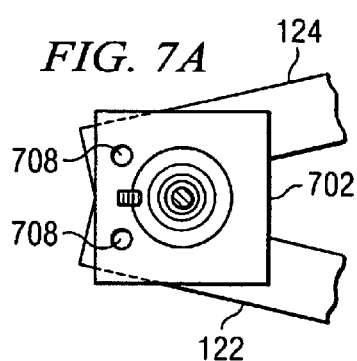

Referring now to FIG. 7, there is illustrated a side view of the projector mount 202 for mounting the projector 120 to the bottom surface of the crossbar members 122 and 124 and FIG. 7A illustrates a bottom view of the mounting of the projector. The projector mount 202 is comprised of an upper securing portion 702 and a lower securing portion 704. The upper portion 702 is comprised of a socket member with the portion 704 having a ball 706 that is disposed within the socket portion. This allows the portion 704 to rotate with respect to the portion 702. A bottom view of the longitudinal members 122 and 124 proximate the apex 126 is illustrated in FIG. 7A. It can be seen that the portion 702 has two or more holes 706 therein for mating with corresponding holes (not shown) in the longitudinal members 122 and 124 such that they can be secured together in a proximate relationship thereto to form the apex 126. With the projector mounting bracket 202, the projector 120 can be tilted at a desired angle. A threaded compression screw 712 is provided that can cause the socket on the member 102 to restrict about the ball 706 to fix the projector 120 at a predetermined angle or position relative to the screen 112.

Figure 8:
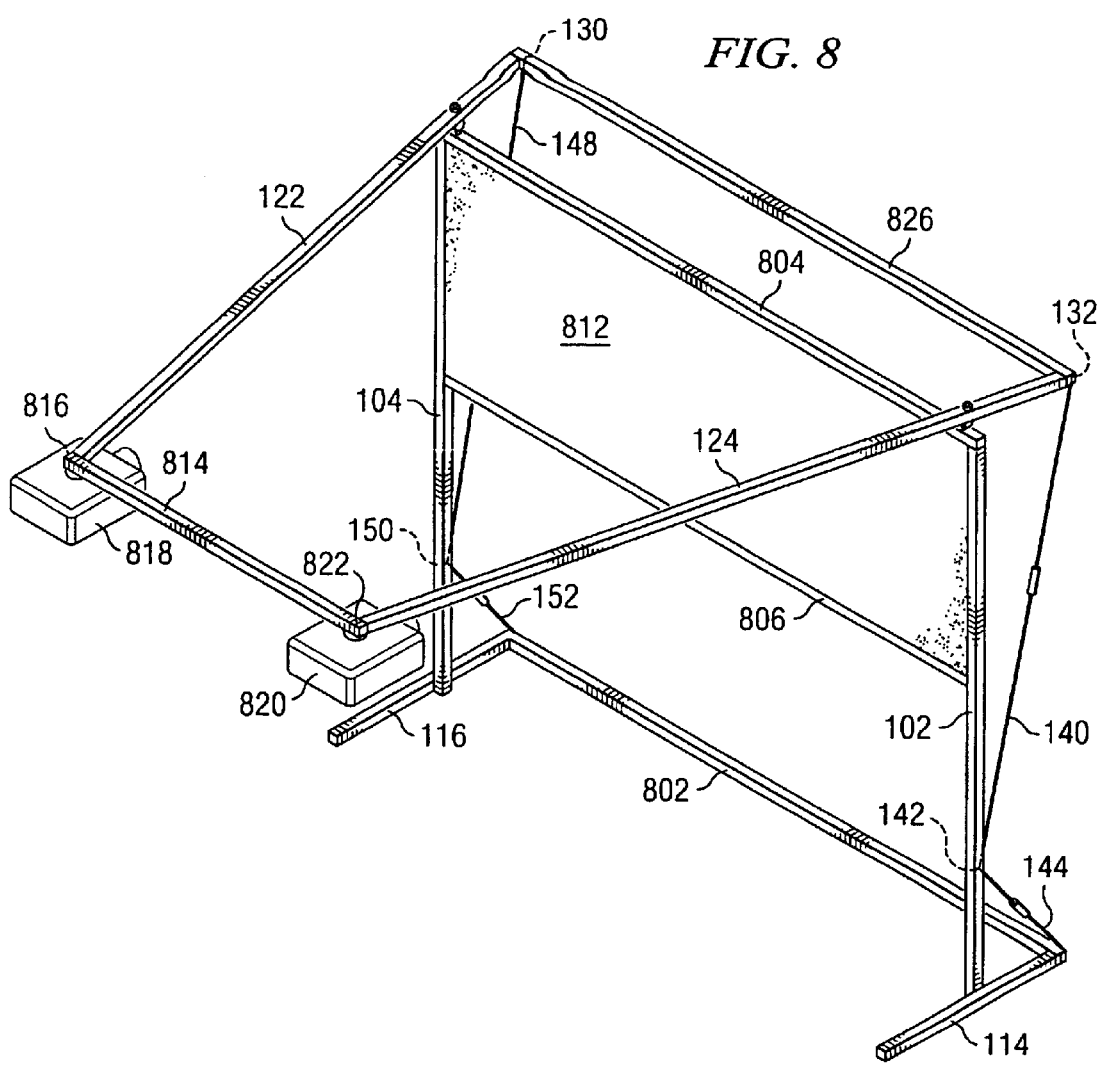
FIG. 8 illustrates an alternate embodiment of the projector mounting system of the present disclosure.

Referring now to FIG. 8, there is illustrated an alternate embodiment of the disclosed projection system. In the embodiment of FIG. 8, the distance between the two vertical members 102 is increased from a dimension of forty two inches to approximately twice that, or a dimension of eighty four inches. To facilitate this, a bottom crossbar member 802 is disposed between the lower ends of the vertical members 102 and 104, and an upper crossbar member 804 is disposed between the upper ends of the vertical members 102 and 104 and is secured thereto. A center crossbar member 806, similar to the crossbar member 110 is disposed between the center of the two vertical members 102 and 104 at approximately the same distance from the upper crossbar member 804 as was the distance of the crossbar member 110 from the crossbar member 108. A screen 812 is disposed within the region bounded by the upper crossbar member 804, the intermediate crossbar member 806 and the vertical members 102 and 104. This screen is approximately the same height as screen 112 but twice the width thereof.

The longitudinal members 122 and 124 are disposed at approximately the same configuration as those associated with the embodiment of FIG. 1. The difference is that the ends thereof extending outward toward the projection side are separated and are no longer joined at an apex. Rather, the ends of the longitudinal members 122 and 124 extending outward from the projection side are connected together with a crossbar member 814 that has a dimension of approximately forty inches. On an end 816 of the member 122 disposed away from the projection side of the apparatus, there is disposed a first projector 818 mounted on the lower surface thereof with a mounting bracket 202 (not shown). A second projector 820 is disposed on an end 822 of the longitudinal member 124 outward from the projection side of the apparatus. At the opposite end of the longitudinal members 122 and 124, there is disposed a crossbar member 826 that is secured to the ends 130 and 132 of the longitudinal members 122 and 124, respectively.

With the configuration of FIG. 8, it can be seen that two projectors can be utilized to provide a wider viewing area, which wider viewing area can be either forward projection or rear projection. Since the cables 140 and 148 are disposed along and parallel to the longitudinal members 102 and 104, they will not be within the viewing area. Further, the cables 140 and 148 are not outside the plane of the longitudinal members 102 and 104 and the leg members 114 and 116 and, therefore, do not interfere with the apparatus being disposed to the side thereof against a wall. The viewing area will not be impeded in a rear projection viewing orientation, since there is no center support disposed vertically upward between crossbar members 802 and 804.

Referring now to FIG. 9, there is illustrated a side view of a typical viewing for both rear projection and forward projection. The projection apparatus is generally referred to by a reference numeral 902. In one embodiment, a seat 904 is provided, it being understood that there is more than one seat provided, that is disposed on the forward projection side. This will allow a viewer to view the projection screen from the "front" side thereof. For rear viewing, a seat 906 representative of a plurality of seats in the viewing area on the rear side can be provided for viewing the program from the rear side.

Although not illustrated, the projector 120 requires cabling thereto for the purpose of providing for signal delivery thereto. This cabling will be provided with fairly light CAT5 cabling that will be run along one of the longitudinal members 122 and 124 and down the vertical members 102 or 104. Further, the cabling could be attached thereto and suspended from a ceiling or some other such source. This will provide the video feed to the projector 120.

Referring now to FIG. 10, there is illustrated an alternate embodiment for the support structure for the projector 120. There is provided a single longitudinal member 1002 that replaces the two longitudinal members 122 and 124. This has the projector 120 mounted on a mounting end 1004 with the opposite end, an end 1006, secured to substantially the center of the crossbar member 128. The longitudinal member 1002 is interfaced with the upper crossbar member 108 on a pivot point 1006 with the pivoting apparatus of FIGS. 5 and 6.

Referring now to FIG. 11, there is illustrated an alternate embodiment of the embodiment of FIG. 1 wherein there are provided two longitudinal members 1102 and 1106, similar to the longitudinal members 122 and 124. However, the angle between the two longitudinal members 1002 and 1006 from an apex 1108 adjacent the attachment point to the projector 120 is smaller than that between the longitudinal members 122 and 124. The two longitudinal members 1002 and 1006 will therefore be interfaced with the upper longitudinal member 108 at pivot points 1110 and 1112 that are closer together than the pivot points 134 and 136. The longitudinal members 1102 and 1106 will be attached to the crossbar member 128 at points 1114 and 1116 at the distal ends thereof such that they arc disposed a distance from the ends of the crossbar member 128.

Although the preferred embodiment has been described in detail, it should be understood that various changes, substitutions and alterations can be made therein without departing from the spirit and scope of the invention as defined by the appended claims.

What is claimed is:

1. A projection apparatus, comprising:

a first vertical member;

a second vertical member disposed parallel to said first vertical member, said second vertical member substantially the same length as said first vertical member;

an upper crossbar member disposed between said first and second vertical members perpendicular thereto;

an intermediate crossbar member disposed between said first and second vertical members and perpendicular thereto and below said upper crossbar member to define a viewing area bounded by said first and second vertical members, said upper crossbar member and said intermediate crossbar member;

a viewing screen disposed over said viewing area;

a mounting member extending over said upper crossbar member and having a mounting end disposed forward of said viewing area a first predetermined distance and a securing end extending rearward of said viewing area a second predetermined distance, said mounting member interfaced to said upper crossbar member in a pivotal manner such that said mounting end is disposed along the length of said viewing area at a predetermined length; and a securing device for securing said securing end of said mounting member to at least one of said vertical members outside of said viewing area.

2. The projection apparatus of claim 1 wherein said securing device is operable to secure said securing end of said mounting member to both of said first and second vertical members outside of said viewing area.

3. The projection apparatus of claim 1 wherein said mounting end is disposed along the length of said viewing area at substantially the center thereof.

4. The projection apparatus of claim 3, wherein said projector is mounted on a mounting bracket, said mounting bracket pivoting to allow adjustment of the angle of said projector relative to said mounting member.

5. The projection apparatus of claim 1 wherein a projector is disposed on said mounting member at said mounting end.

6. The projection apparatus of claim 1 wherein said mounting member comprises:

a first longitudinal member having first and second ends;

a second longitudinal member having first and second ends, said first ends of said first longitudinal member disposed proximate to the first end of said second longitudinal member to form said mounting end of said mounting member;

the angle between said first and second longitudinal members dimensioned such that the distance between said second ends of said first and second longitudinal member is equal to a greater than the distance between said first and second vertical members; and each of said first and second longitudinal members pivotally interfaced with said upper crossbar member a distance from the second ends thereof.

7. The projection apparatus of claim 1, wherein said securing device comprises first and second cables associated with respective ones of said first and second longitudinal members secured to the second ends thereof and extending to the one of said first and second vertical members proximate thereto at a distance along the length thereof.

8. The projection apparatus of claim 1 and further comprising an adjustment device on each of said first and second cables to allow adjustment of the length thereof to adjust the angle of said mounting member relative to a horizontal position perpendicular to said viewing area.

* * * * *